United States Patent Office 3,497,406
Patented Feb. 24, 1970

3,497,406
METHOD OF ETCHING A POLYESTER FILM
Ivan H. Skoog, Washington, Minn., assignor to Minnesota Mining and Manufacturing Company, St. Paul, Minn., a corporation of Delaware
No Drawing. Filed Feb. 3, 1966, Ser. No. 524,847
Int. Cl. B44c 1/22
U.S. Cl. 156—2      10 Claims

ABSTRACT OF THE DISCLOSURE

Process for etching a polyester film in which the film is treated with an essentially anhydrous organic solvent solution of aluminum trichloride, aluminum tribromide or titanium tetrachloride.

---

This invention relates to improved polyester films and to methods for the preparation thereof. In one aspect this invention relates to a method for providing a matte or translucent surface on polyester film. In another aspect this invention provides a method for subbing oriented or unoriented polyester film.

Surface modification of polymeric films is quite often necessary or desirable to alter such physical properties as transparency, adhesion, wettability, surface area, etc. Some polymers, such as polystyrene, are quite readily modified by a wide variety of surface treatment techniques. However, it is frequently more difficult to effect a uniform change in the surface characteristics of oriented or unoriented polyesters without producing discoloration. The treatment of highly polymeric polyester films with sulfuric acid and a chromic acid yielding compound to render their surfaces hydrophilic has tended to produce an undesirable yellow surface color. Although modifier techniques, such as described in U.S. 3,035,916, can be used to minimize this problem, a more complicated procedure requiring a separate treatment with aqueous alkali metal hydroxide solution must be followed. A considerable need exists for white, translucent or matte finished polyester, particularly in various photographic products, tapes, map and tracing films and the like, and for a simple and economical process for its manufacture.

It is therefore an object of this invention to provide a process for rendering a polyester surface more receptive to ink and to pencil markings.

Another object of this invention is to provide a matte finish polyester film which can be pencil marked and which can thereafter be erased without substantially altering the original surface appearance.

Still another object is to provide a technique for altering the adhesive or bonding properties of a polyester film.

Yet another object of this invention is to provide a simple and readily controllable process for imparting translucency to polyester film.

In the practice of this invention a polyester film surface is contacted with a solution of aluminum trichloride, aluminum tribromide, or titanium tetrachloride in an essentially anhydrous organic solvent, preferably at a temperature from about 25° C. to about 125° C. and using at least a 1 weight percent solution of the Al or Ti halide, for a time sufficient to etch said surface and is then washed to remove residual etching solution. The temperature and contact time will vary with the organic solvent in which the $AlCl_3$, $AlBr_3$ or $TiCl_4$ is dissolved, although generally about 10 seconds to about 5 minutes will produce a uniform matte finish on the polyester surface. The etching step may also be conducted at pressures above atmospheric. The preferred organic solvents include nitrobenzene and various acid halides (such as acetyl chloride, fumaryl dichloride, phthaloyl dichloride, benzenesulfonyl chloride, toluenesulfonyl chloride, benzoyl chloride, and thionyl chloride), although other organic solvents in which aluminum chloride, aluminum tribromide or titanium tetrachloride is soluble can also be used, e.g. chlorobenzene, ethanolamine, diethanolamine and anisole, with varying degrees of etch results.

Although the etching bath of this innvention can be used to treat various polymers, including polystyrene, it is of particular value for condensation polyesters, especially the reaction products of at least one dihydric alcohol and one or more aromatic dibasic carboxylic acids or their acid halides, e.g., polyethylene terephthalate and/or isophthalate. Preferred dihydric alcohols have the formula $HOCH_2$—W—$CH_2OH$ where W is methylene, polymethylene or alkyl substituted polymethylene having a 1 to 8 carbon atom chain, (including oxymethylene, polyoxyalkylene or alkyl substituted polyoxyalkylene), or a divalent cycloaliphatic radical of 5 to 6 carbon atoms. Preferred aromatic dibasic carboxylic acids include those containing at least 15 mol percent terephthalic acid, and they may also contain up to 20 mol percent of an aliphatic dicarboxylic acid.

Neither $TiCl_4$ nor the $AlCl_3$ or $AlBr_3$ used alone in aqueous systems produces the desired effect. Solution in essentially anhydrous organic solvent is required to produce a white, matte surface. The following examples will illustrate the practice of this invention.

Example 1

A solution of 50 grams of $AlCl_3$ in 500 ml. of nitrobenzene was prepared. Into this solution, maintained between 25° C. and 60° C. with stirring, sheets of polyethylene terephthalate were immersed for periods ranging from 30 to 90 seconds. The sheets were then washed successively with acetone, water, methanol and acetone, and air dried. A uniform white matte surface was produced on the sheets.

Example 2

A solution of 30 grams $AlCl_3$ in 350 ml. of o-phthaloyl chloride was prepared. This red colored solution was heated to 90–100° C. with stirring, and sample strips of 8 ml. polyethylene terephthalate were slowly pulled through the solution (60–90 second immersion time). The sheets were then successively washed with acetone, water and acetone. An outstanding white matte or translucent polyester surface was obtained on all sample sheets.

Example 3

A solution of 20 grams of aluminum trichloride in 500 grams of p-toluenesulfonyl chloride was heated to 85–90° C. Polyethylene terephthalate strips were pulled slowly through the solution (60–90 second immersion time); then washed successively in acetone, water and acetone. A white, uniform matte finish was produced.

Example 4

Sheets of 4 mil polyethylene terephthalate were agitated in a solution of 25 grams $AlCl_3$ is 500 ml. acetyl chloride for from 30 to 45 seconds at 25–30° C. and were then washed successively in acetone, water, methanol and acetone. The matte finished polyester surface was then overcoated with a conventional silver halide gelatin emulsion of the gravure type. Adhesion between the photosensitive emulsion layer and the polyester surface was good.

Example 5

Strips of polyethylene terephthalate were pulled through a solution of 20 grams $AlCl_3$ in 200 ml. fumaryl chloride at room temperature. After washing successively with acetone, water and acetone the sheets were air dried, then coated with a photosensitive silver halide gravure emulsion. Good adhesion of the emulsion layer to the polyester substrate was obtained.

Example 6

A solution of 30 ml. of titanium tetrachloride in 250 ml. of phthaloyl chloride produced a good etching of a polyethylene terephthalate film at 75° C. (1 minute immersion time). Similarly effective results were obtained with nitrobenzene as the solvent.

Example 7

A solution of 25 grams of $AlBr_3$ in 300 ml. nitrobenzene produced a good etching of polyethylene terephthalate at 80° C. with an immersion time between 1 and 1½ minutes.

Various other embodiments of the present invention will be apparent to those skilled in the art without departing from the spirit or scope thereof.

The embodiments of the invention in which an exclusive property or privilege is claimed are defined as follows:

1. A method for providing a matte finish on a film of a condensation polyester prepared from at least one dihydric alcohol and at least one aromatic dibasic carboxylic acid or its corresponding acid halide which comprises etching the surface of said polyester film with an essentially anhydrous organic solvent solution containing at least 1 weight percent of aluminum trichloride, aluminum tribromide or titanium tetrachloride at a temperature from about 25° C. to about 125° C. for about 10 seconds to about 5 minutes and washing said surface to remove said etching solution.

2. The method of claim 1 in which said organic solvent solution contains aluminum trichloride.

3. The method of claim 2 in which said organic solvent is nitrobenzene.

4. The method of claim 3 in which said organic solvent is an organic acid halide.

5. The method of claim 4 in which said organic acid halide is acetyl chloride, fumaryl dichloride, phthaloyl dichloride, benzenesulfonyl chloride, toluenesulfonyl chloride, benzoyl chloride or thionyl chloride.

6. The method of claim 1 in which said organic solvent contains titanium tetrachloride.

7. The method of claim 6 in which said organic solvent is nitrobenzene.

8. The method of claim 6 in which said organic solvent is an organic acid halide.

9. The method of claim 1 in which said organic solvent contains aluminum tribromide.

10. The method of claim 1 in which said polyester is polyethylene terephthalate.

References Cited

UNITED STATES PATENTS 3,099,572   7/1963   Rion et al.
3,235,426   2/1966   Bruner _____ 156—2

JACOB H. STEINBERG, Primary Examiner

U.S. Cl. X.R.

117—47, 138.8